UNITED STATES PATENT OFFICE 2,601,434

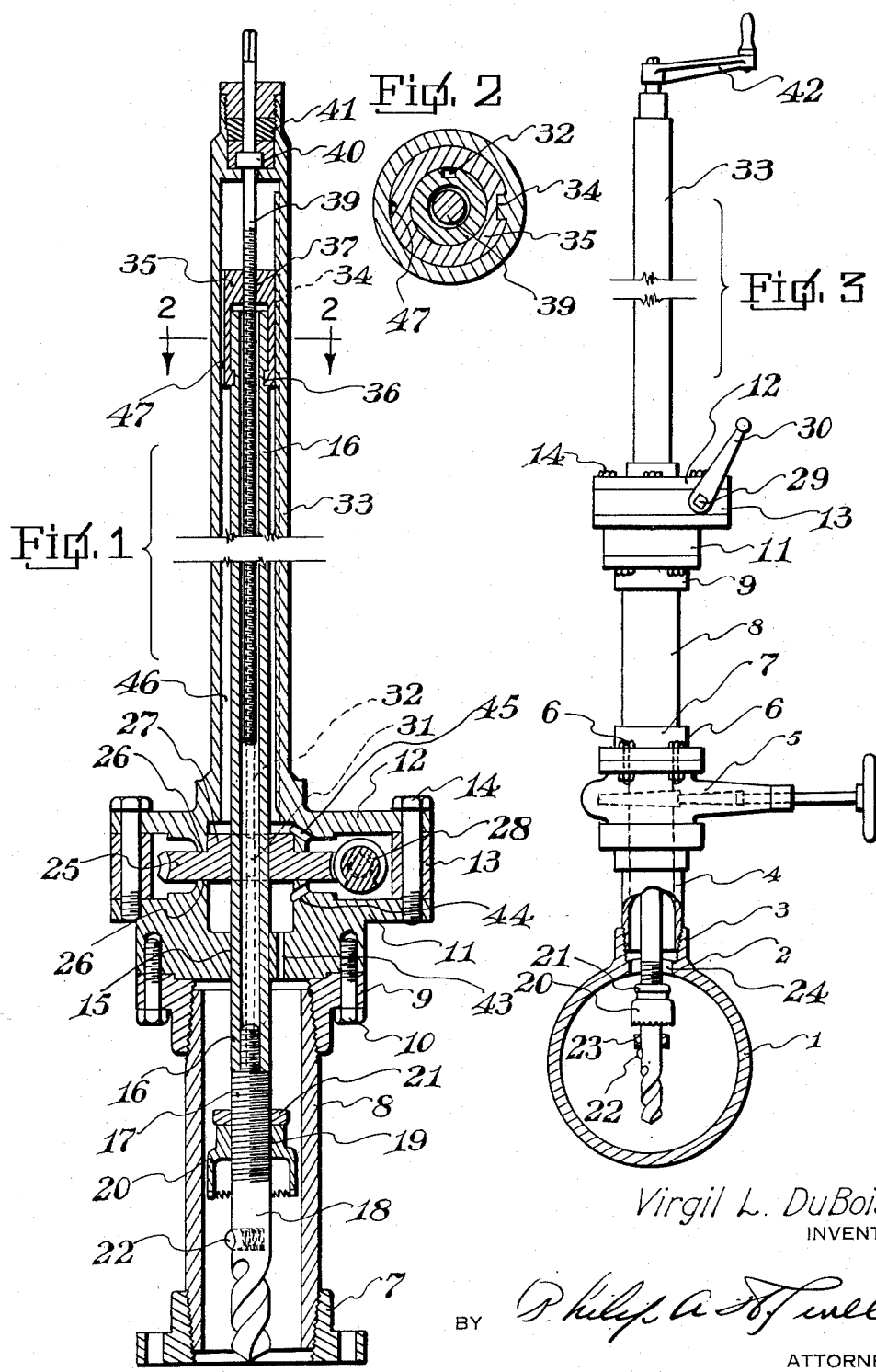

PIPE LINE TAPPING MACHINE

Virgil L. Du Bois, Tulsa, Okla.

Application September 29, 1949, Serial No. 118,601

1 Claim. (Cl. 77—40)

The invention relates to pipe line tapping machines particularly adapted for tapping high pressure lines, and has for its object to provide a device of this kind wherein pressure, during tapping operation, from the line will enter the tapping device and act on the upper end of the drilling mechanism, thereby substantially equalizing the pressure and rendering the drilling operation comparatively easy.

A further object is to provide a pipe line tapping machine comprising a vertically elongated casing adapted to be attached to the periphery of the pipe line, said casing having a drill carrying quill therein, gear rotated, and a feeding mechanism cooperating with the outer end of the quill for feeding the quill and drill towards and away from the pipe line during a drilling operation.

A further object is to provide an axially slidably mounted feed nut within the casing and having a connection with the upper end of the quill and to thread the feed screw through said nut.

A further object is to provide by-pass ports within the casing around the gear drive of the quill and through the feed nut so that pressure can substantially equalize on the upper side of the feed nut so the quill can be easily fed downwardly against the pressure within the pipe line.

With the above and other objects in view the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawing:

Figure 1 is a vertical transverse sectional view through the drilling machine.

Figure 2 is a horizontal sectional view taken on line 2—2 of Figure 1.

Figure 3 is a side elevation of the drilling machine, showing the machine attached to a conventional form of line tapping valve, and showing the drill after the pipe line drilling operation and holding the cut out disc.

Referring to the drawing, the numeral 1 designates a high pressure pipe line, to which line has been attached, by means of brazing at 2, a threaded sleeve 3. Threaded into the sleeve 3 is a nipple 4 carried by one side of the gate valve 5. After these parts have been assembled on the pipe line, the drilling machine as shown in Figure 1 is attached to one side of the valve 5 by means of bolts 6 which bolts pass through the flanged member 7, into which flanged member is threaded the lower end of a casing member 8. Threaded on the upper end of the casing member 8 is a flanged member 9, and to which flanged member 9 is connected, by means of bolts 10, the lower section 11 of the gear casing, which casing is formed by the member 9 and the upper member 12, and the spacer ring 13. All of these parts are connected together by means of bolts 14.

Rotatably mounted in a bearing 15 of the casing member 11 is a quill 16 adapted to move upwardly and downwardly. Threaded in the lower end of the quill 16 is the shank 17 of the drill 18, and also threaded on the drill 18, at 19 is a trepanning tool 20 held in various adjusted positions by a lock nut 21. Drill 18 is provided with a spring actuated detent 22 adapted to hold the disc 23 after the pipe drilling operation, so it can be easily removed with the machine through the drill opening 24 in the pipe line. Disposed within the gear casing is a worm gear 25. Gear 25 is rotatably mounted between annular guide flanges 26 carried by gear casing sections 11 and 12, and the upper side of the worm gear is provided with an annular boss 27 engaging within the annular guide member 26 carried by the upper gear casing section 12. Worm gear 25 is manually rotated by a worm 28 meshing therewith and carried by a shaft 29 having a crank 30 thereon. It will be seen that with the inwardly extending key 31 engaging in the longitudinal keyway 32 of the quill 16, the quill can be rotated through the medium of the worm gear 25, and at the same time the quill can be fed upwardly and downwardly.

Extending upwardly from the upper side of the casing section 12 is a tubular casing 33 of greater interior diameter than the outside diameter of the quill 16 and slidably keyed within the upper end of the casing 33 in a keyway 34 is a feed nut 35. Feed nut moves axially but does not rotate, however, it has a swivel connection at 36 to the upper end of the quill 16 so the quill can rotate at various positions. Threaded through the feed nut 35 at 37 is a feed screw 39, and the feed screw is rotatably mounted in a bearing 40 at its upper end beneath a packing gland 41, and terminates above the casing section 33 so a crank 42 may be applied thereto for feeding the quill upwardly or downwardly during a line tapping operation.

Casing section 11 is provided with a pressure port 43 and by-pass port 44. The last named port extends through the annular flange 26 so that pressure from the pipe line can pass into the chamber of the gear casing and by-pass the gear casing through the port 45, thence through the chamber 46 of the casing section 33 and through the vent channel 47 in the feed nut 35, thereby allowing the pressure from the pipe line to substantially equalize itself above and below the movable parts, therefore the operation of the device will not be against a pressure, as is now the common difficulty with devices. After the drilling operation the quill is fed upwardly to the position shown in Figure 1 and then the valve 5 is closed, after which the machine is removed from the valve casing by disconnecting the bolts 6.

From the above it will be seen that a pipe line tapping device is provided which is simple in operation, and one which is operated against a comparatively low pressure, incident to the pressure equalizing features thereof.

The invention having been set forth what is claimed as new and useful is:

A line tapping drilling machine, said machine comprising an elongated closed casing, means for attaching the lower end of the casing to a pipe line to be drilled, an enlarged gear casing intermediate the ends of the elongated casing, a drill holding quill within the elongated casing and extending through the gear casing in spaced relation to the walls thereof, a worm gear within the gear casing and having a splined connection to the quill, a worm within the gear casing and meshing with the worm gear, means controllable from the outside of the gear casing to rotate the worm and the worm gear, a feed screw cooperating with the upper end of the quill within the elongated casing and forming means whereby said quill may be fed downwardly or upwardly as it is rotated by the worm gear, a feed nut splined within the casing and rotatably connected to the quill, said feed screw being threaded through the feed nut, and bypass ports from the lower end of the casing extending around the worm gear and a further bypass port bypassing one side of the feed nut, said ports forming means whereby pressure from the pipe being drilled will pass upwardly through the casing to a point above the feed nut thereby balancing the pressure and reducing the amount of power required for rotating the quill.

VIRGIL L. DU BOIS.

REFERENCES CITED

The following references are of record in the file of this patent:

UNITED STATES PATENTS

| Number | Name | Date |
|---|---|---|
| 283,857 | Box | Aug. 28, 1883 |
| 660,760 | Mueller | Oct. 30, 1900 |
| 1,094,425 | Cash | Apr. 28, 1914 |
| 2,115,992 | Koppl | May 3, 1938 |

FOREIGN PATENTS

| Number | Country | Date |
|---|---|---|
| 765,332 | France | Mar. 19, 1934 |